(12) United States Patent
Gupta et al.

(10) Patent No.: US 7,069,311 B2
(45) Date of Patent: *Jun. 27, 2006

(54) MULTI-LEVEL SKIMMING OF MULTIMEDIA CONTENT USING PLAYLISTS

(75) Inventors: Anoop Gupta, Woodinville, WA (US); Li-Wei He, Redmond, WA (US); Nosakhare D. Omoigui, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/016,628

(22) Filed: Dec. 17, 2004

(65) Prior Publication Data

US 2005/0120126 A1 Jun. 2, 2005

Related U.S. Application Data

(63) Continuation of application No. 09/498,439, filed on Feb. 4, 2000, now Pat. No. 6,868,440.

(51) Int. Cl.
  *G06F 13/00* (2006.01)
(52) U.S. Cl. .................. 709/219; 709/203; 709/217
(58) Field of Classification Search ........ 709/200–203, 709/217–219, 231, 236; 382/171–178
See application file for complete search history.

(56) References Cited

U.S. PATENT DOCUMENTS

| | | | |
|---|---|---|---|
| 4,931,950 A | 6/1990 | Isle et al. | 364/513 |
| 5,050,161 A | 9/1991 | Golestani | 370/60 |
| 5,119,474 A | 6/1992 | Beitel et al. | 395/154 |
| 5,274,758 A | 12/1993 | Beitel et al. | 395/154 |
| 5,309,562 A | 5/1994 | Li | |
| 5,313,454 A | 5/1994 | Bustini et al. | 370/13 |
| 5,341,474 A | 8/1994 | Gelman et al. | 395/200 |
| 5,414,455 A | 5/1995 | Hooper et al. | 348/7 |
| 5,434,848 A | 7/1995 | Chimento, Jr. et al. | 370/17 |
| 5,455,910 A | 10/1995 | Johnson et al. | 395/650 |
| 5,481,542 A | 1/1996 | Logston et al. | 370/94.2 |
| 5,490,252 A | 2/1996 | Macera et al. | 395/200.01 |
| 5,504,744 A | 4/1996 | Adams et al. | 370/60.1 |
| 5,519,701 A | 5/1996 | Colmant et al. | 370/60.1 |
| 5,521,630 A | 5/1996 | Chen et al. | 348/7 |
| 5,533,021 A | 7/1996 | Branstad et al. | 370/60.1 |
| 5,537,408 A | 7/1996 | Branstad et al. | 370/79 |

(Continued)

FOREIGN PATENT DOCUMENTS

EP 0605115 7/1994

(Continued)

OTHER PUBLICATIONS

Arons, Barry, "SpeechSkimmer: A System for Interactively Skimming Recorded Speech", ACM Transactions on Computer-Human, vol. 4, No. 1, pp. 3-38.

(Continued)

*Primary Examiner*—Moustafa M. Meky
(74) *Attorney, Agent, or Firm*—Lee & Hayes, PLLC

(57) ABSTRACT

A skimmed or preview version of multimedia content is provided to a client computer by a server computer using playlists. The skimmed version of multimedia content can be presented to a user of a client computer in less time than presenting the entire multimedia content would require. The server computer maintains skimming information that identifies particular segments of the multimedia content corresponding to the skimmed version. The server computer uses the skimming information to generated a playlist, which in turn is used by the server computer to access the appropriate segments of the multimedia content and provided the segments to the client computer.

18 Claims, 11 Drawing Sheets

U.S. PATENT DOCUMENTS

| | | | |
|---|---|---|---|
| 5,541,955 A | 7/1996 | Jacobsmeyer | |
| 5,559,942 A | 9/1996 | Gough et al. | 395/155 |
| 5,566,175 A | 10/1996 | Davis | 370/84 |
| 5,572,651 A | 11/1996 | Weber et al. | |
| 5,574,724 A | 11/1996 | Bales et al. | 370/68.1 |
| 5,592,608 A | 1/1997 | Weber et al. | |
| 5,614,940 A | 3/1997 | Cobbley et al. | |
| 5,617,423 A | 4/1997 | Li et al. | |
| 5,623,690 A | 4/1997 | Palmer et al. | 395/806 |
| 5,625,405 A | 4/1997 | DuLac et al. | 348/7 |
| 5,640,320 A | 6/1997 | Jackson et al. | 364/192 |
| 5,664,227 A | 9/1997 | Mauldin et al. | 395/778 |
| 5,692,213 A | 11/1997 | Goldberg et al. | |
| 5,717,691 A | 2/1998 | Dighe et al. | 370/401 |
| 5,717,869 A | 2/1998 | Moran et al. | 395/339 |
| 5,719,786 A | 2/1998 | Nelson et al. | 364/514 |
| 5,721,829 A | 2/1998 | Dunn et al. | 395/200.49 |
| 5,742,347 A | 4/1998 | Kandlur et al. | 348/426 |
| 5,768,533 A | 6/1998 | Ran | 395/200.77 |
| 5,786,814 A | 7/1998 | Moran et al. | 345/328 |
| 5,794,210 A | 8/1998 | Goldhaber et al. | 705/14 |
| 5,794,249 A | 8/1998 | Orsolini et al. | 707/104 |
| 5,799,292 A | 8/1998 | Hekmatpour | |
| 5,801,685 A | 9/1998 | Miller et al. | 345/302 |
| 5,808,662 A | 9/1998 | Kinney et al. | 348/15 |
| 5,818,510 A | 10/1998 | Cobbley et al. | |
| 5,822,537 A | 10/1998 | Katseff et al. | 395/200.61 |
| 5,828,848 A | 10/1998 | MacCormack et al. | 395/200.77 |
| 5,835,495 A | 11/1998 | Ferriere | |
| 5,835,667 A | 11/1998 | Wactlar et al. | 386/96 |
| 5,838,906 A | 11/1998 | Doyle et al. | 395/200.32 |
| 5,859,641 A | 1/1999 | Cave | 345/348 |
| 5,864,682 A | 1/1999 | Porter et al. | 395/200.7 |
| 5,870,755 A | 2/1999 | Stevens et al. | 707/104 |
| 5,873,735 A | 2/1999 | Yamada et al. | 434/316 |
| 5,892,506 A | 4/1999 | Hermanson | 345/302 |
| 5,903,673 A | 5/1999 | Wang et al. | 382/236 |
| 5,918,002 A | 6/1999 | Klemets et al. | 395/182.16 |
| 5,930,787 A | 7/1999 | Minakuchi et al. | 707/4 |
| 5,953,506 A | 9/1999 | Kalra et al. | 395/200.61 |
| 5,956,026 A | 9/1999 | Ratakonda | |
| 5,956,716 A | 9/1999 | Kenner et al. | 707/10 |
| 5,995,095 A | 11/1999 | Ratakonda | |
| 5,995,941 A | 11/1999 | Maquire et al. | 705/10 |
| 5,999,979 A | 12/1999 | Vellanki et al. | 709/232 |
| 6,006,241 A | 12/1999 | Purnaveja et al. | 707/512 |
| 6,014,706 A | 1/2000 | Cannon et al. | 709/231 |
| 6,023,731 A | 2/2000 | Chawla | 709/231 |
| 6,029,195 A | 2/2000 | Herz | |
| 6,032,130 A | 2/2000 | Alloul et al. | 705/27 |
| 6,035,341 A | 3/2000 | Nunally et al. | 709/253 |
| 6,041,345 A | 3/2000 | Levi et al. | |
| 6,047,327 A | 4/2000 | Tso et al. | |
| 6,049,823 A | 4/2000 | Hwang | 709/218 |
| 6,064,794 A | 5/2000 | McLaren et al. | 386/68 |
| 6,118,450 A | 9/2000 | Proehl et al. | 345/349 |
| 6,118,817 A | 9/2000 | Wang | 375/240 |
| 6,128,653 A | 10/2000 | del Val et al. | 709/219 |
| 6,133,920 A | 10/2000 | deCarmo et al. | 345/354 |
| 6,144,375 A | 11/2000 | Jain et al. | |
| 6,148,304 A | 11/2000 | De Vries et al. | 707/104 |
| 6,154,771 A | 11/2000 | Rangan et al. | 709/217 |
| 6,166,314 A | 12/2000 | Weinstock et al. | |
| 6,173,317 B1 | 1/2001 | Chaddha et al. | 709/219 |
| 6,181,234 B1 | 1/2001 | Szwarc et al. | |
| 6,181,342 B1 | 1/2001 | Niblack | |
| 6,185,527 B1 | 2/2001 | Petkovic et al. | |
| 6,188,398 B1 | 2/2001 | Collins-Rector et al. | |
| 6,195,654 B1 | 2/2001 | Wachtel | |
| 6,199,076 B1 | 3/2001 | Logan et al. | |
| 6,204,840 B1 | 3/2001 | Petelycky et al. | |
| 6,215,910 B1 | 4/2001 | Chaddha | 382/253 |
| 6,230,172 B1 | 5/2001 | Purnaveja et al. | |
| 6,230,205 B1 | 5/2001 | Garrity et al. | |
| 6,233,389 B1 | 5/2001 | Barton et al. | 386/46 |
| 6,263,507 B1 | 7/2001 | Ahmad et al. | |
| 6,317,710 B1 | 11/2001 | Huang et al. | |
| 6,366,296 B1 | 4/2002 | Boreczky et al. | |
| 6,366,956 B1 | 4/2002 | Krishnan | |
| 6,385,619 B1 | 5/2002 | Eichstaedt et al. | |
| 6,446,130 B1 | 9/2002 | Grapes | |
| 6,535,639 B1 | 3/2003 | Uchihachi et al. | |
| 6,567,980 B1 | 5/2003 | Jain et al. | |

FOREIGN PATENT DOCUMENTS

| | | |
|---|---|---|
| EP | 0653884 | 5/1995 |
| EP | 0 669 587 A2 | 8/1995 |
| EP | 0676898 | 10/1995 |
| EP | 0746158 | 12/1996 |
| EP | 0 812 112 A2 | 10/1997 |
| WO | WO 94/01964 | 1/1994 |
| WO | WO 98/37698 | 8/1998 |

OTHER PUBLICATIONS

Internet Reference "An Annotated Bibliography of Interactive Speech User Interfaces by Barry Arons" HTTP://barons.www.media.mit.edu/people/barons/AronsAnnotated_Bibliography.html, Date unknown.

"GSM Full Rate Speech Transcoding," ETSI/PT 12, Feb. 1992, pp. 1-93.

"Speech Codec for the European Mobile Radio System," P. Vary et al., 1988, pp. 227-230.

Informedia—Internet References, http://www.informedia.cs.cmu.edu, date unknown.

Microsoft Corporation and RealNetworks, Inc., "Advanced Streaming Format (ASF) Specification", Feb. 26, 1998. Public Specification Version 1.0, 55 pgs.

H.J. Chen et al., "A Scalable Video-on-Demand Service for the Provision of VCR-Like Functions," IEEE, May 15, 1995, pp. 65-72.

Lynda Hardman et al., "Multimedia authoring paradigms," *Authoring and Application of Hypermedia-Based User-Interfaces, IEE Colloquium*, The Institution of Electrical Engineers 1995, pp. 8/1-8/3.

John David N. Dionisio and Alfonso F. Cardenas, "A Unified Data Model for Representing Multimedia, Timeline, and Simulation Data," *IEEE Transactions on Knowledge and Data Engineering*, vol. 10, No. 5, Sep./Oct. 1998, pp. 746-767.

Smith, Michael A and Kanade, Takeo, "Video Skimming and Characterization through the Combination of Image and Language Understand Techniques", 1997, IEEE 1063-6919/97, pp. 775-781.

1

MULTI-LEVEL SKIMMING OF MULTIMEDIA CONTENT USING PLAYLISTS

RELATED APPLICATIONS

This is a continuation of Application Ser. No. 09/498,439, filed Feb. 4, 2000, entitled "Multi-Level Skimming of Multimedia Content Using Playlists", which is hereby incorporated by reference herein, and it is now U.S. Pat. No. 6,868,440.

TECHNICAL FIELD

This invention relates to networked client/server systems and to methods of streaming and rendering multimedia content in such systems. More particularly, the invention relates to generating, maintaining and providing multiple skimmed versions of multimedia content using playlists.

BACKGROUND OF THE INVENTION

Multimedia streaming—the continuous delivery of synchronized media data like video, audio, text, and animation—is a critical link in the digital multimedia revolution. Today, streamed media is primarily about video and audio, but a richer, broader digital media era is emerging with a profound and growing impact on the Internet and digital broadcasting.

Synchronized media means multiple media objects that share a common timeline. Video and audio are examples of synchronized media—each is a separate data stream with its own data structure, but the two data streams are played back in synchronization with each other. Virtually any media type can have a timeline. For example, an image object can change like an animated .gif file, text can change and move, and animation and digital effects can happen over time. This concept of synchronizing multiple media types is gaining greater meaning and currency with the emergence of more sophisticated media composition frameworks implied by MPEG-4, Dynamic HTML, and other media playback environments.

The term "streaming" is used to indicate that the data representing the various media types is provided over a network to a client computer on a real-time, as-needed, basis, rather than being pre-delivered in its entirety before playback. Thus, the client computer renders streaming data as it is received from a network server, rather than waiting for an entire "file" to be delivered.

In comparison to text-based or paper-based presentations, multimedia presentations can be very advantageous. Synchronized audio/visual presentations, for example, are able to capture and convey many subtle factors that are not perceivable from paper-based documents. Even when the content is a spoken presentation, an audio/visual recording captures gestures, facial expressions, and various speech nuances that cannot be discerned from text or even from still photographs.

Although streaming multimedia content compares favorably with textual content in most regards, one disadvantage is that it requires significant time for viewing. It cannot be "skimmed" like textural content. Thus, a "summarized" or "skimmed" version of the multimedia content would be very helpful.

Various technologies are available for "summarizing" or "previewing" different types of median content. For example, technology is available for removing pauses from spoken audio content. Audio content can also be summarized with algorithms that detect "important" parts of the content as identified by pitch emphasis. Similarly, techniques are available for removing redundant or otherwise "unimportant" portions or frames of video content. Similar schemes can be used with other types of media streams, such as animation streams and script streams.

Although such previewing techniques are available, these techniques typically require a significant amount of processing power to be performed and a significant amount of time to be completed. Such constraints make it difficult to generate previews "on the fly" as the data is being streamed to its destination.

One solution is to pre-generate and store a "preview" version of the multimedia content, thereby reducing the impact of "on the fly" calculations. However, generating and storing such a preview version creates a storage problem. The multimedia content itself frequently requires a significant amount of storage space. By storing an additional preview version of the multimedia content, the storage space requirements are increased further, thereby generating significant constraints on the media storage device. This problem is exacerbated if multiple preview versions are generated and stored.

The invention described below addresses these disadvantages of previewing multimedia content, providing an improved way to generate and maintain such preview content.

SUMMARY OF THE INVENTION

A system includes a multimedia server computer that can provide multimedia content, as well as skimmed versions of the multimedia content, to one or more client computers. A skimmed version of the multimedia content is a preview or summary of the multimedia content that can be presented to a user in less time than presenting the entire multimedia content would require.

One or more skimmed versions of multimedia content are provided by the server computer using playlists. Skimming information is maintained by the server computer for each skimmed version, the skimming information identifying particular segments of the multimedia content for a particular skimmed version. The server computer (or alternatively the client computer) uses the skimming information to generate a playlist of multimedia segments of the multimedia content. Rather than maintaining the actual segments of the multimedia content, the playlist identifies segments of the multimedia content. The playlist is used by the server computer to access the appropriate segments of the multimedia content and provide such segments to the client computer(s).

Additionally, a user can select different skimmed versions that he or she will be presented with. The user can make such selections prior to or during presentation of a skimmed version of the multimedia content. Upon selecting a different skimmed version, one of the server computer or the client computer generates a playlist for the newly selected skimmed version and determines a location in the new playlist that corresponds to the location being presented in the current playlist. Presentation of the new skimmed version then begins at the corresponding location in the new playlist.

BRIEF DESCRIPTION OF THE DRAWINGS

The present invention is illustrated by way of example and not limitation in the figures of the accompanying

DETAILED DESCRIPTION

General Network Structure

Figure 1:
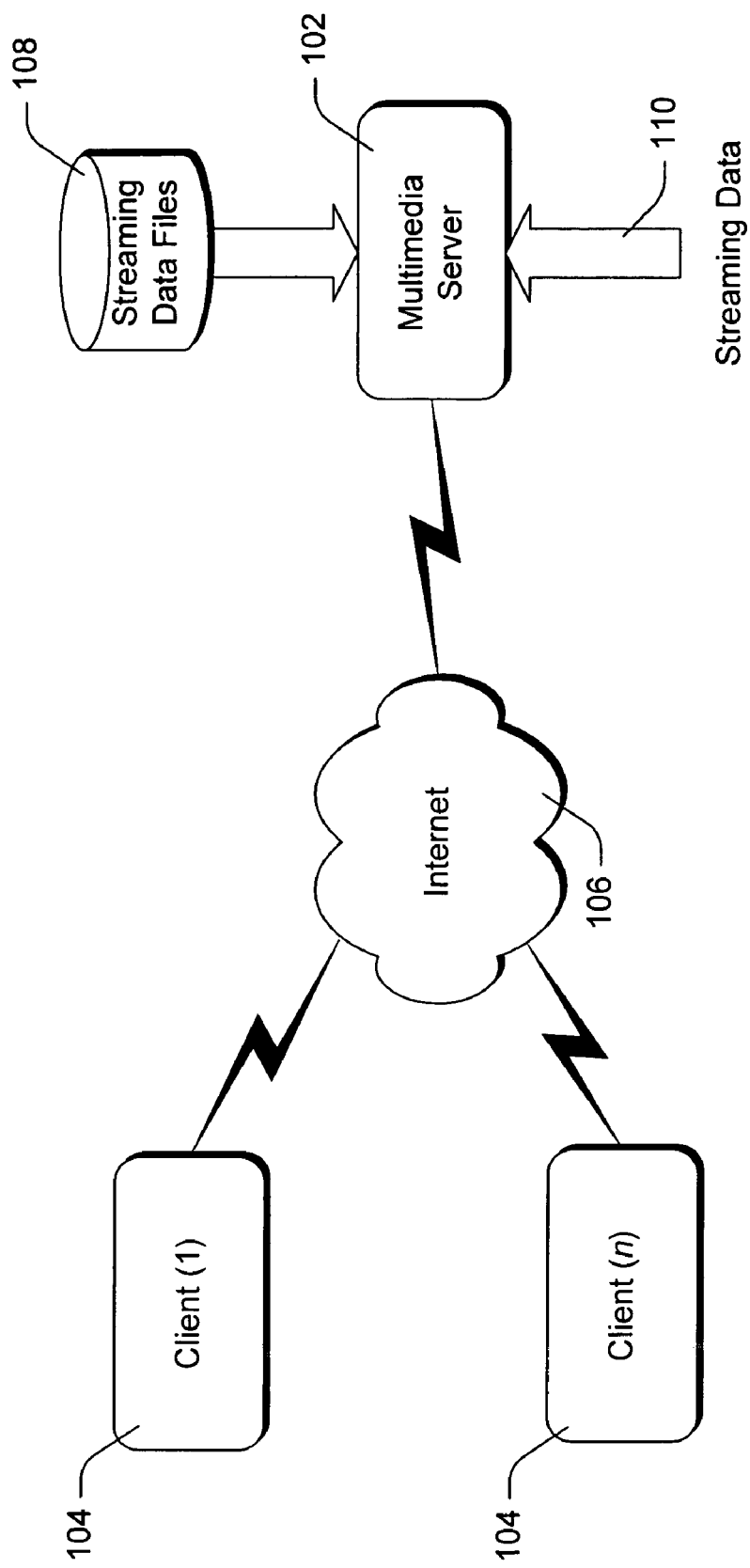
FIG. 1 shows a client/server network system and environment in accordance with the invention.

FIG. 1 shows a client/server network system and environment in accordance with the invention. Generally, the system includes one or more network server computers 102, and multiple (n) network client computers 104. The computers communicate with each other over a data communications network. The communications network in FIG. 1 comprises a public network 106 such as the Internet. The data communications network might also include local-area networks and private wide-area networks.

Multimedia server 102 has access to streaming media content in the form of different media streams. These media streams can be individual media streams (e.g., audio, video, graphical, etc.), or alternatively composite media streams including multiple such individual streams. Some media streams might be stored as files 108 in a database or other file storage system, while other media streams 110 might be supplied to the server on a "live" basis from other data source components through dedicated communications channels or through the Internet itself.

Multimedia server 102 also has access to data or information identifying different skimmed versions of the media streams. This "skimming" information identifies different segments of media streams that are part of a particular skimmed version of that stream. Multiple skimming versions or "skimming levels" can be maintained for each media stream. By using the skimming information to identify portions of media streams, storage space requirements are reduced because the data of the media streams need not be duplicated.

In the discussions to follow, the multimedia content available to the client computers 104 is discussed as being streaming media. However, it should be noted that the invention can also be used with "pre-delivered" media rather than streaming media, such as media previously stored at the client computers 104 via the network 106, via removable magnetic or optical disks, etc.

Streaming Media

In this discussion, the term "composite media stream" describes synchronized streaming data that represents a segment of multimedia content. The composite media stream has a timeline that establishes the speed at which the content is rendered. The composite media steam can be rendered to produce a plurality of different types of user-perceivable media, including synchronized audio or sound, video graphics or motion pictures, animation, textual content, command script sequences, or other media types that convey time-varying information or content in a way that can be sensed and perceived by a human. A composite media stream comprises a plurality of individual media streams representing the multimedia content. Each of the individual media streams corresponds to and represents a different media type and each of the media streams can be rendered by a network client to produce a user-perceivable presentation using a particular presentation medium. The individual media streams have their own timelines, which are synchronized with each other so that the media streams can be rendered simultaneously for a coordinated multimedia presentation. The individual timelines define the timeline of the composite stream.

There are various standards for streaming media content and composite media streams. "Advanced Streaming Format" (ASF) is an example of such a standard, including both accepted versions of the standard and proposed standards for future adoption. ASF specifies the way in which multimedia content is stored, streamed, and presented by the tools, servers, and clients of various multimedia vendors. ASF provides benefits such as local and network playback, extensible media types, component download, scalable media types, prioritization of streams, multiple language support, environment independence, rich inter-stream relationships, and expandability. Further details about ASF are available from Microsoft Corporation of Redmond, Wash.

Regardless of the streaming format use, an individual data stream contains a sequence of digital data sets or units that are rendered individually, in sequence, to produce an image, sound, or some other stimuli that is perceived by a human to be continuously varying. For example, an audio data stream comprises a sequence of sample values that are converted to a pitch and volume to produce continuously varying sound. A video data stream comprises a sequence of digitally-specified graphics frames that are rendered in sequence to produce a moving picture.

Typically, the individual data units of a composite media stream are interleaved in a single sequence of data packets. Various types of data compression might be used within a particular data format to reduce communications bandwidth requirements.

The sequential data units (such as audio sample values or video frames) are associated with both delivery times and presentation times, relative to an arbitrary start time. The delivery time of a data unit indicates when the data unit should be delivered to a rendering client. The presentation time indicates when the value should be actually rendered. Normally, the delivery time of a data unit precedes its presentation time.

The presentation times determine the actual speed of playback. For data streams representing actual events or performances, the presentation times correspond to the relative times at which the data samples were actually recorded. The presentation times of the various different individual data streams are consistent with each other so that the streams remain coordinated and synchronized during playback.

Exemplary Computer Environment

In the discussion below, the invention will be described in the general context of computer-executable instructions, such as program modules, being executed by one or more conventional personal computers. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, mini-computers, mainframe computers, and the like. In a distributed computer environment, program modules may be located in both local and remote memory storage devices.

Figure 2:
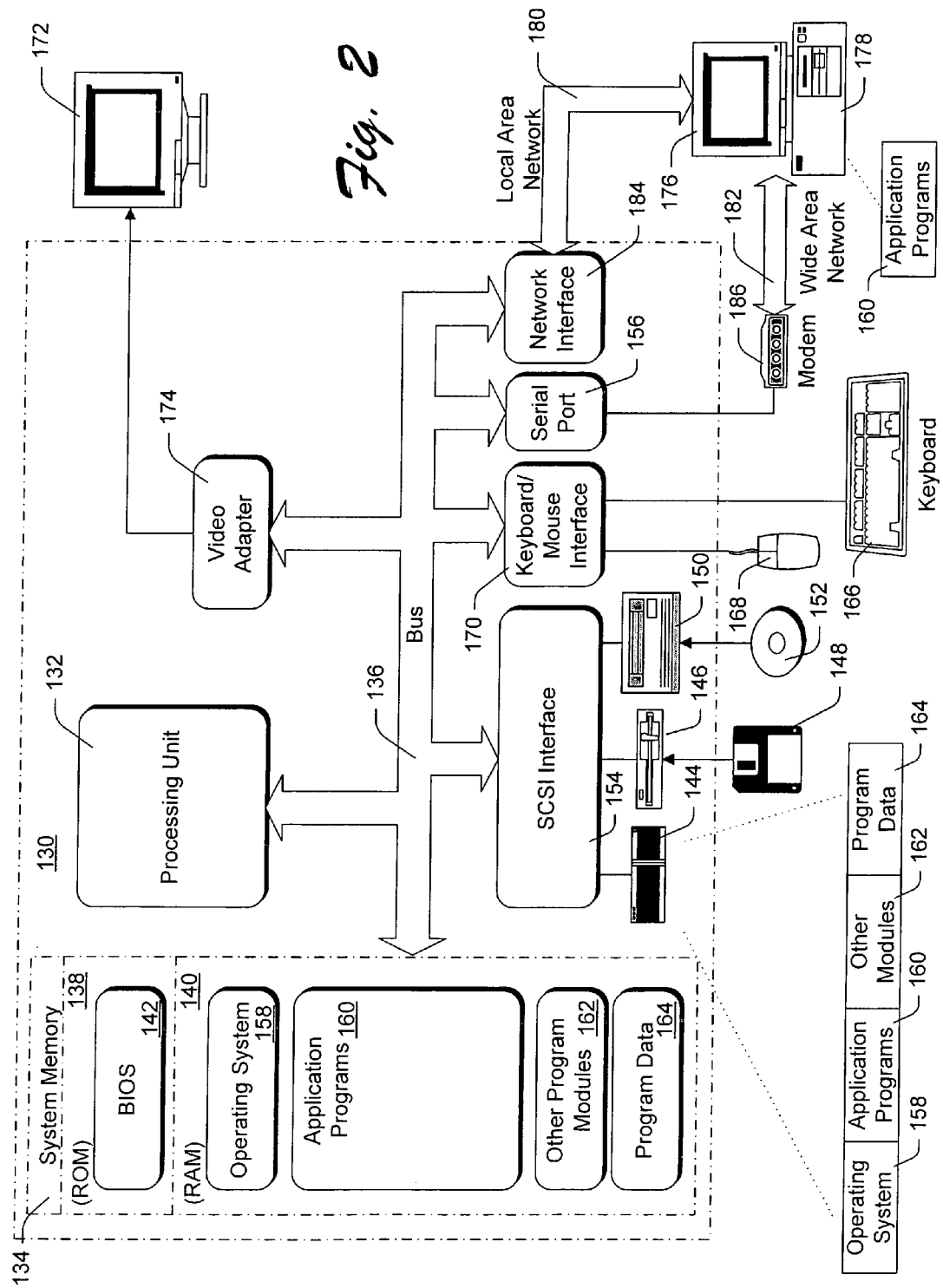
FIG. 2 shows a general example of a computer that can be used as a server or client in accordance with the invention.

FIG. 2 shows a general example of a computer 130 that can use used as a server or client in accordance with the invention. Computer 130 is shown as an example of a computer that can perform the functions of a server computer 102 or a client computer 104 of FIG. 1.

Computer 130 includes one or more processors or processing units 132, a system memory 134, and a bus 136 that couples various system components including the system memory 134 to processors 132.

The bus 136 represents one or more of any of several types of bus structures, including a memory bus or memory controller, a peripheral bus, an accelerated graphics port, and a processor or local bus using any of a variety of bus architectures. The system memory includes read only memory (ROM) 138 and random access memory (RAM) 140. A basic input/output system (BIOS) 142, containing the basic routines that help to transfer information between elements within computer 130, such as during start-up, is stored in ROM 138. Computer 130 further includes a hard disk drive 144 for reading from and writing to a hard disk, not shown, a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer readable instructions, data structures, program modules and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 148, optical disk 152, ROM 138, or RAM 140, including an operating system 158, one or more application programs 160, other program modules 162, and program data 164. A user may enter commands and information into computer 130 through input devices such as keyboard 166 and pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet. In the described embodiment of the invention, remote computer 176 executes an Internet Web browser program such as the "Internet Explorer" Web browser manufactured and distributed by Microsoft Corporation of Redmond, Wash.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below. Furthermore, certain sub-components of the computer may be programmed to perform the functions and steps described below. The invention includes such sub-components when they are programmed as described. In addition, the invention described herein includes data structures, described below, as embodied on various types of memory media.

For purposes of illustration, programs and other executable program components such as the operating system are illustrated herein as discrete blocks, although it is recognized that such programs and components reside at various times in different storage components of the computer, and are executed by the data processor(s) of the computer.

Generating Skimmed Versions

Multiple preview or skimmed versions of multimedia content can be created, such versions being referred to as being different "skimming levels". Each of these different skimming levels provides a different level of detail of the multimedia content, and thus typically includes a different total presentation time. For example, a first skimming level may represent little of the original multimedia content and have a presentation time of 15 minutes rather than the 2 hour presentation time of the entire multimedia content. A second skimming level may represent more of the original multimedia content and have a presentation time of 1 hour.

Figure 3:
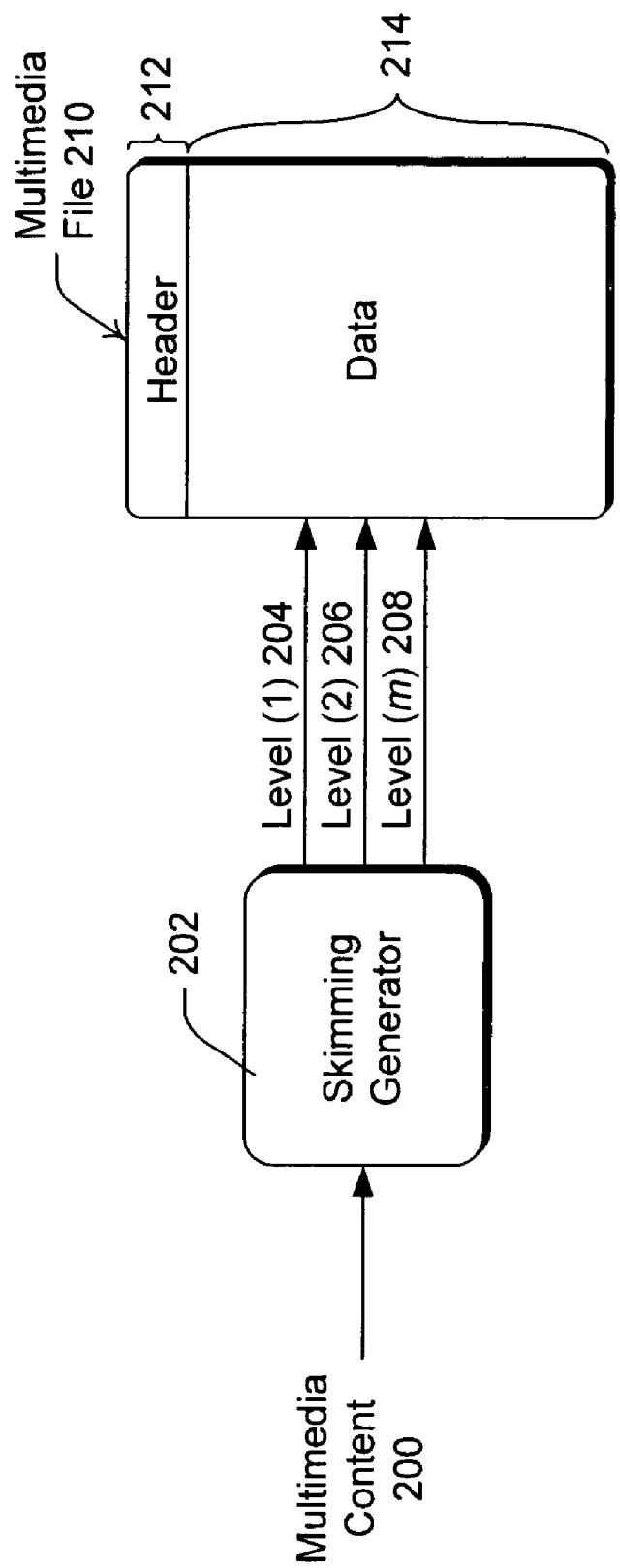
FIG. 3 is an exemplary block diagram showing the generation of skimming level information for multimedia content.

FIG. 3 is an exemplary block diagram showing the generation of skimming level information for multimedia content. Multimedia content 200 is received by a skimming generator 202. Skimming generator 202 can be implemented in hardware, or software, such as a software program executing on a computer 130 of FIG. 2. Additionally, skimming generator 202 can be implemented in server computer 102 of FIG. 1, or alternatively in another computer (not shown) either coupled to or independent of network 106. Multimedia content 200 can be provided to skimming generator 202 in a variety of different manners, such as streaming of a live presentation, streaming of a data file, "pre-delivery" of a data file (e.g., on a CD-ROM or transferred via network 106 of FIG. 1), etc.

Skimming generator 202 processes the multimedia content 200 to create multiple (m) skimming levels 204, 206, and 208 corresponding to the multimedia content 200. Skimming generator 202 separates the multimedia content into multiple segments and generates the multiple skimming levels 204–208 using various combinations of these segments. Each of the skimming levels 204–208 comprises a different set of these multimedia segments. Skimming generator 202 uses any of a variety of conventional summarizing or previewing technologies (e.g., pitch analysis to detect important parts of audio content and similar techniques to identify important parts of video content) to generate the skimming levels 204–208.

The results of the various previewing techniques for different streams may identify different portions of the multimedia content that are more important. In the illustrated example, this situation is resolved by using a composite scoring method to identify which segments are more important (and thus are kept as part of the skimmed version), and which segments are less important (and thus are not included as part of the skimmed version).

Alternatively, the results of one of the previewing techniques on a single data stream may be used to identify which segments are to be dropped. For example, a single data stream (e.g., the audio stream) may be evaluated, with the results of that evaluation being used to identify which segments of the audio stream (and corresponding segments of the video and other steams) are dropped without any evaluation of the corresponding segments of the other streams.

Skimming information for each of the skimming levels 204–208 is then stored in multimedia file 210. This skimming information can be, for example, identifies of particular segments of the multimedia content, importance rankings for each of multiple segments of the multimedia content, etc. Additionally, an indication of the total number m of skimming levels is also stored in multimedia file 210.

In the illustrated example, the multimedia content 200 is received by skimming generator 202 as multimedia file 210. Thus, skimming generator 202 stores the skimming information for each of the skimming levels 204–208 back into the same data file as the multimedia content 200 is stored in In the example illustrated in FIG. 3, multimedia file 210 is an ASF file. Multimedia file 210 includes a header portion 212 and a data portion 214. Header portion 212 contains data representing various control and identifying information regarding the multimedia file 210. Data portion 214 contains the multimedia content as well as the skimming information for each of the skimming levels 204–208.

The skimming level generation process identifies different segments of the multimedia content 200 for each of the different levels 204–208. Skimming generator 202 then stores data identifying these different segments in the data portion 214 of multimedia file 210. Alternatively, a linear separation technique could be used to delineate the segments, such as each segment being a 5-second portion of the multimedia content.

Alternatively, rather than storing identifiers of particular segments of the multimedia content, skimming generator 202 could generate particular "rankings" for each segment of the multimedia content. These rankings are generated using the conventional summarizing or previewing technologies to identify which portions of the multimedia content are more important than which others or alternatively could be generated manually. The different portions are then assigned a particular rank or weight (e.g., "high", "medium", and "low"; or any of an infinite number of rankings (such as real number values between zero and one)). These rankings can then be subsequently used to dynamically identify which segments should be presented for a particular skimming level.

Additionally, skimming generator 202 identifies the relationship between the presentation timeline of the original multimedia content and the segments identified by the skimming information. This relationship may be stored as an additional stream in multimedia file 210, or alternatively as one or more index tables associated with multimedia file 210. The relationship is a mapping of presentation times of the skimmed version to the original multimedia content, indicating for any presentation time of the skimmed version, what the corresponding presentation time of the original multimedia content is. For example, the data 35 seconds into the skimmed version may correspond to 120 seconds into the original multimedia content. This stored relationship thus allows the server (or client) computer, during subsequent playback of a skimmed version, to identify the current presentation point with respect to the original multimedia content. A similar mapping is maintained for presentation times of the original multimedia content to locations of the skimmed version (e.g., presentation times, byte offsets into the skimmed stream, segment identifiers, etc.).

Figure 4:
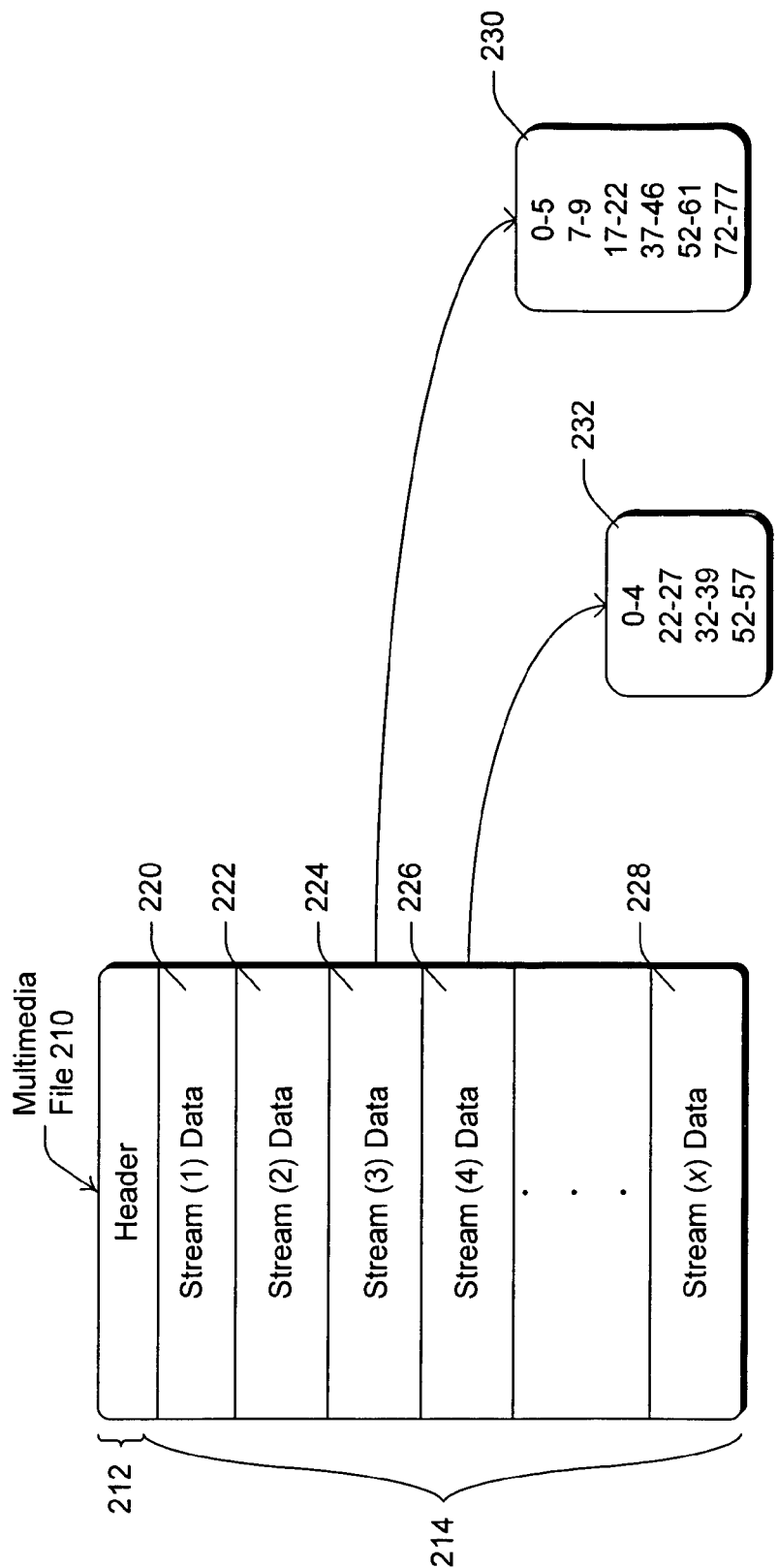
FIG. 4 illustrates a multimedia file of FIG. 3 in more detail.

FIG. 4 illustrates a multimedia file 210 in more detail. Multimedia file 210 includes header portion 212 containing various control and identifying information regarding the multimedia file 210. Header portion 212 includes data identifying each of the streams in data portion 214, and optionally may include the number of different skimmed versions maintained in data portion 214. Skimming information for each skimmed version is maintained as a stream in data portion 214, referred to as a "skimming stream".

Data portion 214 includes data representing multiple (x) streams 220, 222, 224, 226, and 228. Streams 220–228 include media stream data for the multimedia content, such as audio data and video data of a composite media stream, as well as skimming streams that include skimming information for the multimedia content.

In the illustrated example, streams 224 and 226 are skimming streams that include "markers" (e.g., time ranges) used to identify the segments of the multimedia content. The markers can be used to generate a "playlist" identifying particular segments of the multimedia content that are to be provided for the corresponding skimming level. A playlist includes a reference to the multimedia content, as well as start and end times for one or more segments of the multimedia content. Alternatively, a skimming stream may include rankings or weights for each of multiple segments of the multimedia content.

In the illustrates playlists of FIG. 4, the segments are identified by start and end times corresponding to the timeline of the original multimedia content. Thus, the playlist 230 identified by stream 224 indicates the first five seconds (0–5) of the multimedia content, as well as the seventh through ninth seconds (7–9) seventeenth through twenty-second seconds (1714 22), thirty-seventh through forty-sixth second (37–46), fifty-second through sixty-first seconds (52–61), and seventy-second through seventy-seventh seconds (72–77) of the multimedia content. Similarly, the playlist 232 identified by stream 226 indicates the first four seconds (0–4) of the multimedia content, as well as the twenty-second through twenty-seventh seconds (22–27), thirty-second through thirty-ninth seconds (32–39), and fifty-second through fifty-seventh seconds (52–57) of the multimedia content.

Figure 5:
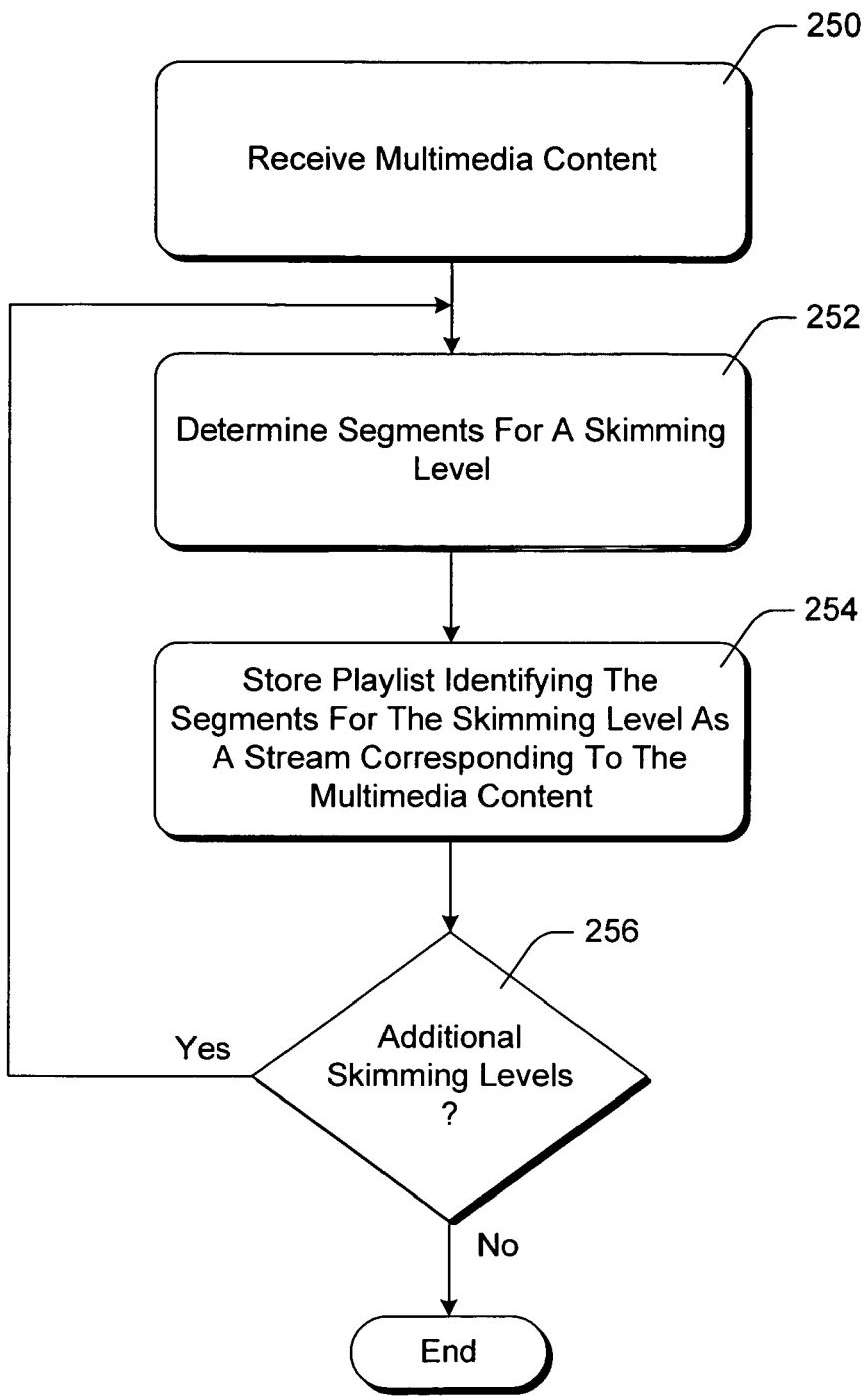
FIG. 5 is a flowchart illustrating an exemplary process for generating skimming level information in accordance with the invention.

FIG. 5 is a flowchart illustrating an exemplary process for generating skimming level information in accordance with the invention. The process of FIG. 5 is implemented by skimming generator 202 of FIG. 3, and may be performed in software. FIG. 5 is described with additional reference to components in FIGS. 3 and 4.

Initially, multimedia content is received by skimming generator 202 (step 250). Skimming generator 202 then determines which segments of the multimedia content correspond to a skimming level (step 252). As discussed above, the generation of different segments can be accomplished using any of a variety of conventional previewing techniques.

Skimming generator 202 also stores skimming information identifying the segments determined in step 252 as a stream of multimedia file 210 corresponding to the multimedia content (step 254). Skimming generator 202 then checks whether additional skimming levels are to be generated (step 256). The number of skimming levels and their levels of detail can be pre-programmed into skimming generator 202, or alternatively can be manually input by a user.

Skimmed Version Presentation

When providing a skimmed version of the multimedia content to a user, server computer 102 of FIG. 1 accesses multimedia file 210 of FIG. 4 for the stream 220–228 corresponding to the requested skimming level. Server computer 102 then generates a playlist for that stream that identifies which of the segments of the multimedia content are to be provided to the client as the skimmed version. Alternatively, the client computer could generate the playlist.

Figure 6:
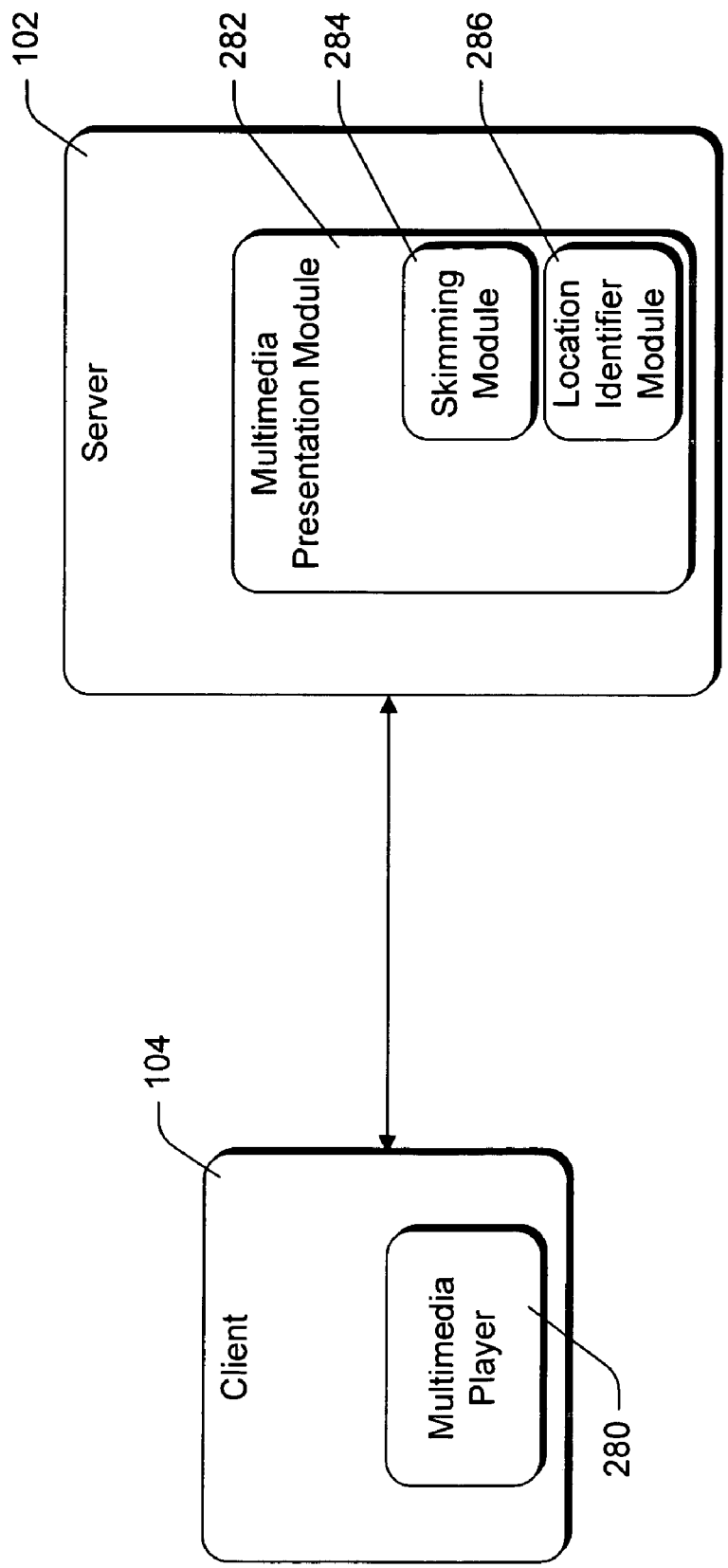
FIG. 6 illustrates exemplary client and server computers in which the playlist for the skimmed version is generated at the server computer.

FIG. 6 illustrates exemplary client and server computers in which the playlist for the skimmed version is generated at the server computer. Client computer 104 includes a multimedia player 280 that provides a user interface (UI) allowing a user to be presented with streaming multimedia content. The multimedia player 280 may be incorporated into the operating system or run as a separate, self-contained application. In either case, the multimedia player operates in a graphical user interface windowing environment such as provided by the "WINDOWS" brand of operating systems, available from Microsoft Corporation of Redmond, Wash.

Multimedia player 280 communicates with a multimedia presentation module 282 of server computer 102. Multimedia presentation module 282 streams the multimedia content to multimedia play 280 for presentation to the user. Multimedia presentation module 282 can stream the entire multimedia content to multimedia player 280 for presentation. Additionally, multimedia presentation module 282 can distinguish between streams of multimedia content and streams that contain skimming information. Multimedia presentation module 282 uses the skimming information to transmit a skimmed version of the multimedia content to the multimedia player 280 as well.

Multimedia presentation module 282 includes a skimming module 284 and a location identifier module 286. Skimming module 284 controls the provision of skimming level options to the user, allowing the user to select (via the interface of multimedia player 280) a skimmed version for presentation. Additionally, skimming module 284 also provides multimedia presentation module 282 with the control to access skimming information and provide the segment(s) of the multimedia content corresponding to the skimming information to client computer 104.

In the illustrated example, skimming module 284 accesses the skimming information (e.g., in multimedia file 210 of FIG. 4) corresponding to a user-selected skimming level. Skimming module 284 uses this information to generate a playlist for the skimming level. Multimedia presentation module 282 uses the playlist generated by skimming module 284 to identify which segments of the multimedia content to provide to the client computer 104 as the selected skimmed version of the multimedia content. Alternatively, rather than comprising skimming information from which a playlist is generated, the stream in multimedia file 210 could comprise a playlist that can be accessed by skimming module 284 "as is", without requiring any additional generating step.

Alternatively, in situations where the skimming information is a rank for each segment of the multimedia content, skimming module 284 uses the rankings to generate an appropriate playlist. Skimming module 284 uses a user-selected skimming level as a threshold for generating the playlist. For example, skimming module 284 includes in the playlist any segments having a ranking equal to or greater than the threshold.

A user, through the interface provided by multimedia player 280, is able to select different skimmed versions by selecting a different skimming level. This selection can occur prior to being presented with a skimmed version and/or while being presented with a skimmed version.

When a user changes the skimming level, multimedia player 280 provides, to multimedia presentation module 282, information identifying the current presentation time of the multimedia segment being provided to the user. This current time information could be a reference to the original multimedia content (e.g., 36 minutes and 20 seconds into the original multimedia content), or alternatively an identification of the current segment of the skimmed version being presented and an offset into that segment (e.g., five seconds into the third segment of the skimmed version).

Location identifier module 286 uses the information provided by multimedia player 280 (either current presentation time or current segment and offset) to determine a new location in the playlist of the newly selected skimming level. As discussed above, a mapping of each skimmed version to the original multimedia presentation is part of (or stored separately but corresponding to) the multimedia file 210 that includes the skimming information. Using these mappings, location identifier module 286 is able to identify the location in the new skimmed version to which the current location of the current skimmed version corresponds.

Location identifier module 286 identifies the location in the new playlist by accessing the mapping for the current skimmed version using the current location in the current skimmed version. The mapping (e.g., an index table) identifies a location in the original multimedia content that corresponds to the current location in the current skimmed version. The identified location from the original multimedia content is then used to access the mapping for the new skimmed version, which identifies a location in the new skimmed version that corresponds to the identified location of the original multimedia content, and thus to the current location in the current skimmed version.

Alternatively, additional mappings can be maintained that alleviate the necessity for such a "two-step" lookup process. Direct skimmed version to skimmed version mappings can be generated and maintained (either by server 102 or by skimming generator 202 of FIG. 3) that map locations in one skimmed version to corresponding locations of other skimmed versions.

Figure 7:
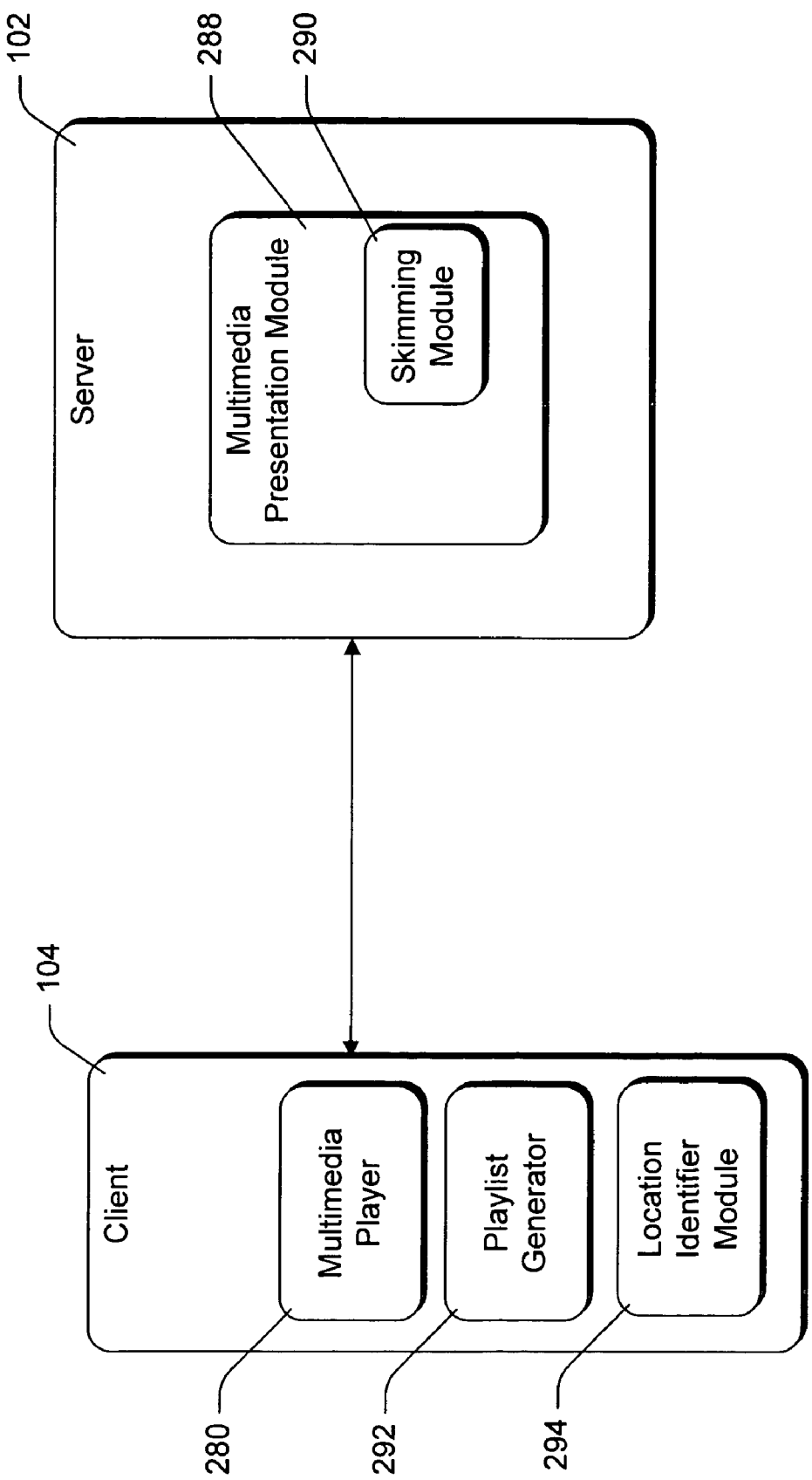
FIG. 7 illustrates alternate client and server computers in which the playlist for the skimmed version is generated at the client computer.

FIG. 7 illustrates alternate client and server computers in which the playlist for the skimmed version is generated at the client computer. Client computer 104 includes a multimedia player 280 that provides an interface for the user to be presented with streaming multimedia content. Multimedia player 280 communicates with a multimedia presentation module 288 of server computer 102. Multimedia presentation module 288 streams the multimedia content to multimedia player 280 for presentation to the user. Multimedia presentation module 288 can stream the entire multimedia content to multimedia player 280 for presentation, or alternatively a skimmed version(s) of the multimedia content.

Multimedia presentation module 288 includes a skimming module 290 that controls the provision of skimming level options to the user. Skimming module 290 allows the user to select (via the interface of multimedia player 280), a skimmed version for presentation. Skimming module 290 also provides the skimming information corresponding to the multimedia content to playlist generator 292 of client 104. Multimedia player 280 communicates a user-selection of a skimming level to playlist generator 292, which in turn uses the skimming information to generate a playlist for the skimming level. This generated playlist is transferred to multimedia presentation module 288 of server 102, which in turn uses the generated playlist to identify which segments of the multimedia content to provide to the client computer 104 as the selected skimming version of the multimedia content.

Additionally, a user is able, through the interface provided by multimedia player 280, to change the skimmed version he or she is being presented with. The user can select an initial skimming level and/or change the current skimming level while being presented with a skimmed version. When a user changes the skimming level, location identifier module 294 determines the proper location within the playlist of the newly selected skimming level.

When a user changes the skimming level, multimedia player 280 provides, to location identifier module 294, information identifying the current presentation time of the multimedia segment being provided to the user. Location identifier module 294 uses this information to determine a new location in the playlist of the newly selected skimming level in a manner analogous to location identifier module 286 of FIG. 6.

Figure 8:
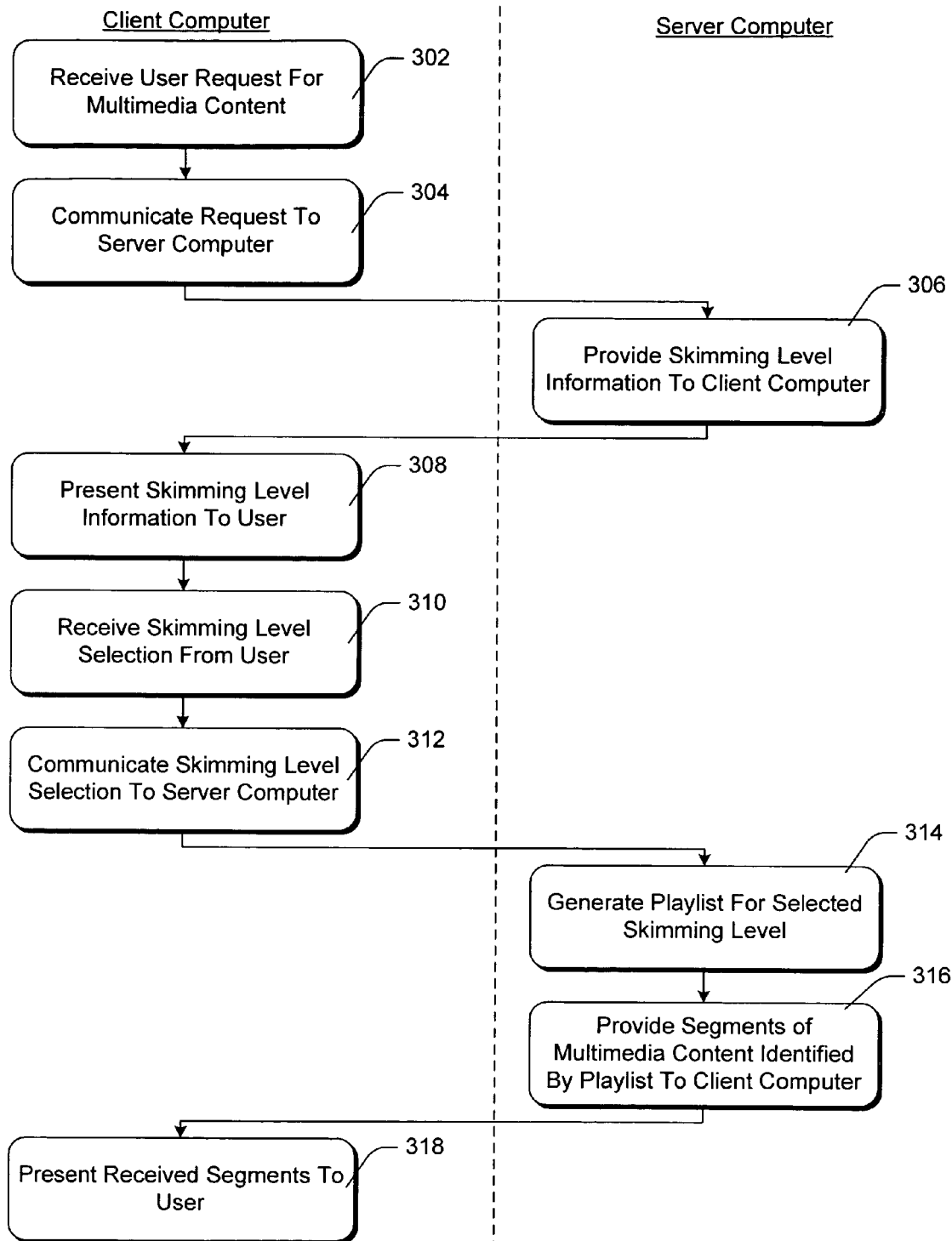
FIG. 8 is a flowchart illustrating exemplary steps in presenting multimedia segments corresponding to a skimming level to a user in accordance with the invention.

FIG. 8 is a flowchart illustrating exemplary steps in presenting multimedia segments corresponding to a skimming level to a user in accordance with the invention. The steps on the left side of FIG. 8 are implemented by client computer 104 of FIG. 6, and the steps on the right side of FIG. 8 are implemented by server computer 102. The steps of FIG. 8, on both client and server computers, may be performed in software. FIG. 8 is described with additional reference to components in FIG. 6.

Initially, the client computer 104 receives a user request for multimedia content (step 302). The request can be initiated by the user in any of a variety of conventional manners, such as selection of a multimedia title in a graphical user interface (GUI), a menu selection a command-line input, etc. Client computer 104 communicates the user request to server computer 102 (step 304), such as by sending a message to server computer 102.

Server computer 102, upon receipt of the request, accesses the multimedia file corresponding to the request and provides the skimming level information regarding the multimedia content to client computer 104 (step 306). Client computer 104 presents the skimming level information to the user (step 308). Based on the presented information, the user can select one of the skimming levels. Client computer 104 receives the skimming level selection (step 310) and communicates the selection to server computer 102 (step 312).

Server computer 102, upon receipt of the skimming level selection, accesses the skimming information and generates the playlist for the selected skimming level (step 314). Alternatively, the playlist could be generated by client computer 104 as discussed above with reference to FIG. 7. Server computer 102 then provides the segments of the multimedia content that are identified by the playlist generated in step 314 to client computer 104 (step 316). These segments are received by client computer 104, which in turn presents the segments to the user (step 318).

Various optimizations may also be implemented to improve the quality of the presentation of the multimedia content when streaming the segments of the multimedia content identified by a playlist to client computer 104. One such optimization is pre-buffering of the multimedia content at client computer 104. Subsequent segments of multimedia content can be buffered at client computer 104 while current segments are being presented to the user. Thus client computer 104 can seamlessly switch from presentation of the current segments to presentation of the next segments in the playlist.

Additionally, multimedia content may be streamed as multiple frames, including independent frames and dependent frames. Independent frames include all of the information necessary to present (e.g., display video or play audio) a frame (or sample) of data, while dependent frames identify only differences between the dependent frame and one or more previous frames (either dependent or independent). Playlists may include segments that begin at either independent frames or dependent frames. If the beginning of a segment is at a dependent frame, then additional information prior to the beginning of that segment is needed in order to generate the appropriate data for the dependent frame.

This situation can be resolved in a variety of different manners. In one implementation, the additional information (e.g., the previous independent frame and possibly intervening dependent frames) is transmitted from server computer 102 to client computer 104. This can result in a noticeable pause to the user while the additional information is processed. In another implementation, if the beginning points for segments are known in advance, additional "specialized" independent frames can be generated as necessary in advance that include the necessary additional information. In this implementation, the specialized independent frames is transmitted to client computer 104 along with the first dependent frame of the segment, thereby alleviating client computer 104 from having to process additional information spread over potentially numerous independent and dependent frames.

Figure 9:
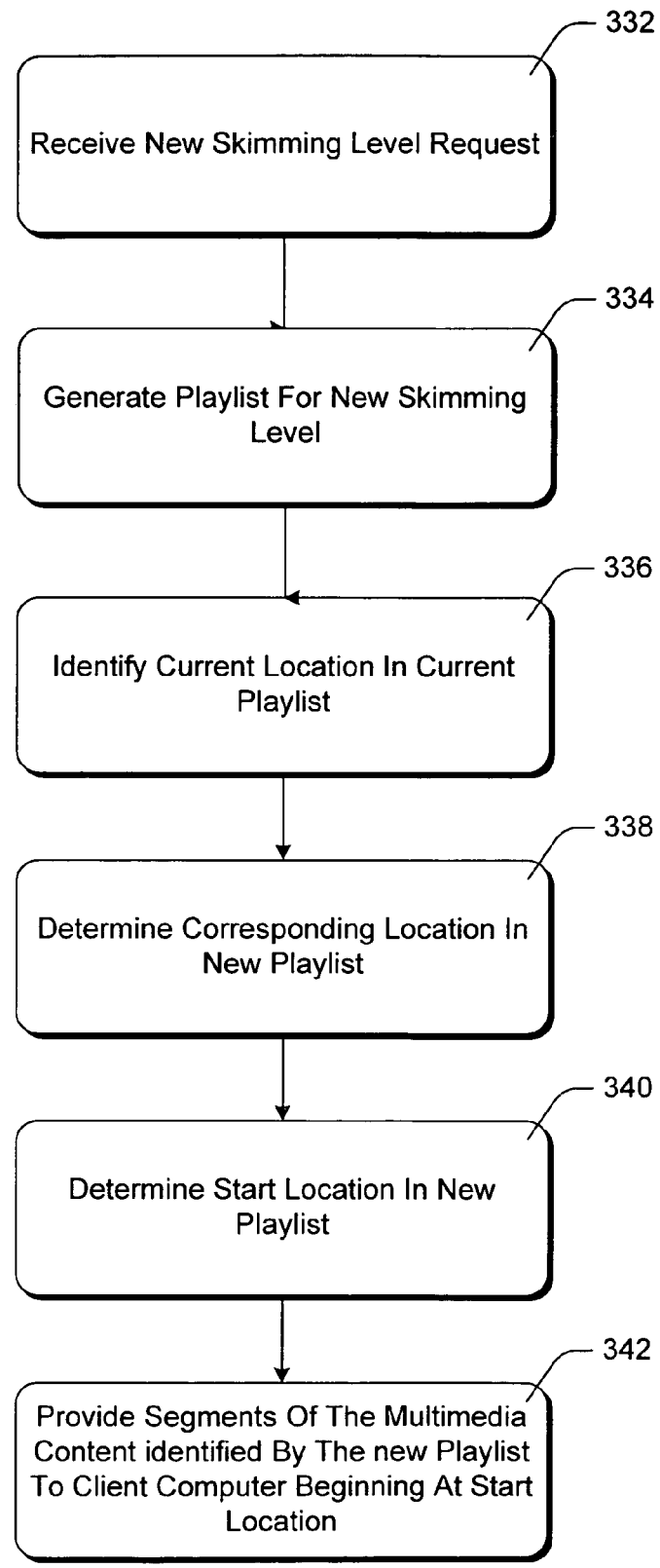
FIG. 9 is a flowchart illustrating exemplary steps in changing skimming levels in accordance with the invention.

FIG. 9 is a flowchart illustrating exemplary steps in changing skimming levels in accordance with the invention. The steps of FIG. 9 are implemented by server computer 102, and may be performed in software. Alternatively, steps 332–338 could be implemented by client computer 104. FIG. 9 is described with additional reference to components in FIG. 6.

Initially, server computer 102 receives an indication of a new skimming level request (step 332). Upon receipt of the indication, server computer 102 generates a playlist for the newly selected skimming level (step 334). Server computer 102 then identifies the current location in the current playlist that is being presented to the user (step 336). Using this current location, server computer 102 determines the corresponding location in the playlist for the new skimming level (step 338). Server computer 102 then determines the start location within the new playlist (step 340). Server computer then provides the segments of the multimedia content identified by the new playlist to the client computer beginning at the start location (step 342).

In the illustrated embodiment, the start location within the new playlist determined in step 340 is the beginning of the segment corresponding to the location identified in step 338. For example, if the user requests a new skimming level at a presentation time that corresponds to five seconds into the seventh segment of the new playlist, then the start location is determined in step 340 to be the beginning of the seventh segment of the new playlist. Alternatively, the start location cold be determined in step 340 to be five seconds into the seventh segment of the new playlist.

User Experience

Figure 10:
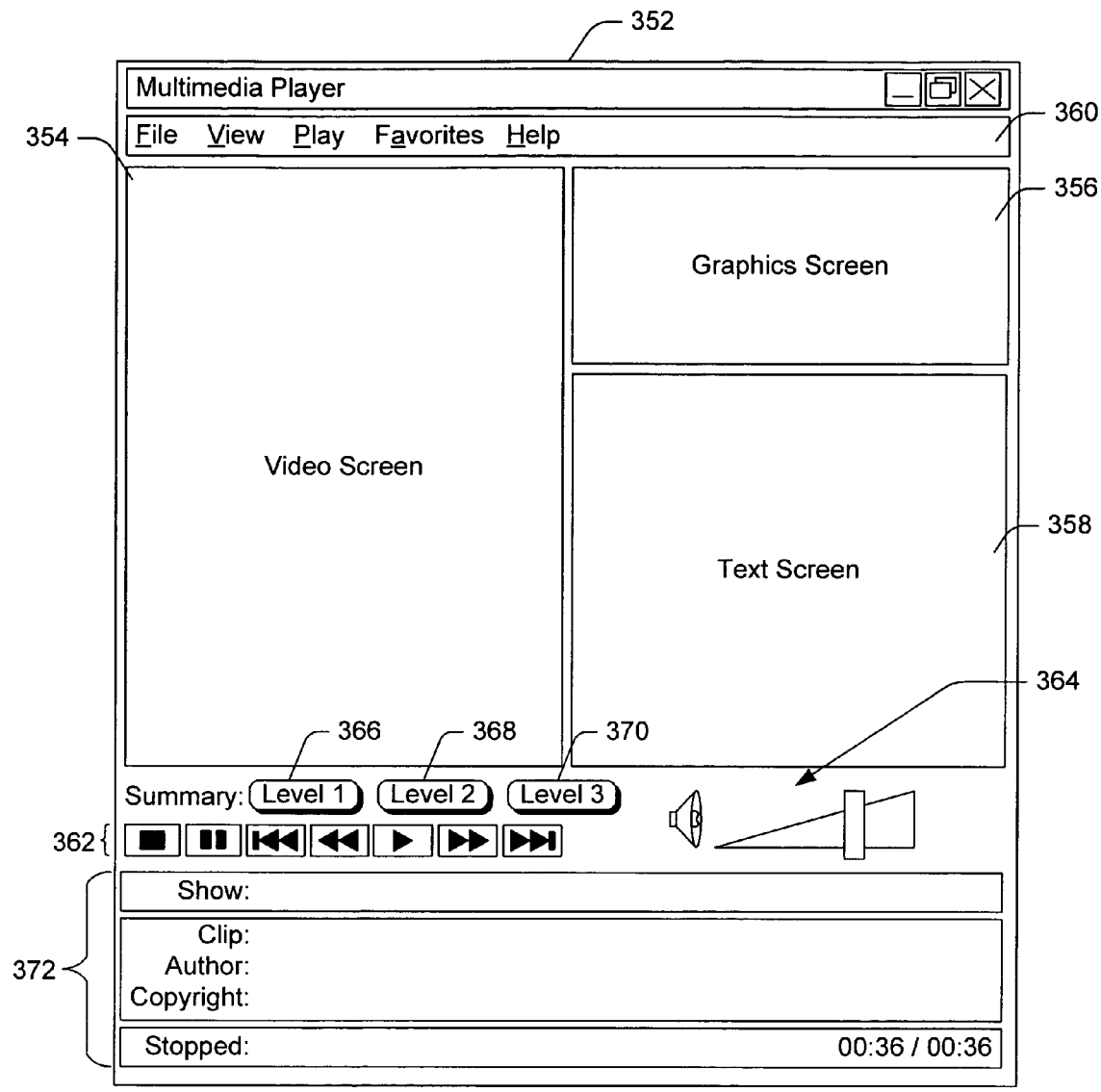
FIG. 10 shows one implementation of a graphical user interface window that displays multimedia content at a client computer.

FIG. 10 shows one implementation of a graphical user interface window 352 that displays multimedia content at a client computer 104 of FIG. 1. The user interface 352 is provided by multimedia player 280 of FIG. 6 or FIG. 7. The UI window 352 includes a video screen 354, a graphics screen 356, and a text screen 358.

Video screen 354 is the region of the UI within which the video portion of the multimedia content is rendered. If the multimedia content does not include video data, screen 354 displays static or dynamic images representing the content. For audio, content, for example, a dynamically changing frequency wave that represents an audio signal can be displayed in screen 354.

Graphics screen 356 is the region of the UI within which the graphics portion of the multimedia content is rendered. The graphics portion can include, for example, a set of slides or presentation foils that correspond to the video portion. If the multimedia content does not include graphics data, then the graphics screen 356 is left blank (or an indication given that no graphics are available).

Text screen 358 is the region of the UI within which the text portion of the multimedia content is rendered. The text portion can include, for example, a table of contents that outlines the multimedia content. If the multimedia content does not include text data, then the text screen 358 is left blank (or an indication given that no graphics are available).

The UI window 352 also includes a command bar 360, shuttle controls 362, a volume control 364, summary level selectors 366, 368, and 370, and content information space 372. Command bar 360 lists familiar UI commands, such as "File", "View", and so forth.

Shuttle controls 362 allow the user to control playback of the multimedia content. Shuttle controls 362 include a stop button, a pause button, rewind buttons, a play button, and fast forward buttons. Selection of the fast forward (or rewind buttons) cause the multimedia player to jump ahead or back in the media presentation by a predetermined amount (e.g., one second, five seconds, to the next segment, etc.). The play, stop, and pause buttons cause their conventional functions to be performed by media player 280.

Three different summary buttons 366, 368, and 370 are included corresponding to different summary levels. Selection of summary button 366 causes multimedia player 280 to present a skimmed version of the multimedia content having a first level of detail to the user. Similarly, selection of summary button 368 causes multimedia player 280 to present a skimmed version of the multimedia content having a second level of detail, while selection of summary button 370 causes multimedia player 280 to present a skimmed version of the multimedia content having a third level of detail.

The user can actuate one of the summary buttons 366–370 via a UI actuation mechanism, such as a pointer or by tabbing to the desired play button and hitting the "enter" key. Upon selection of a summary button, the multimedia player presents the skimmed version of the multimedia content corresponding to the selected skimming level.

Similarly, the user can actuate any of the buttons of the shuttle controls 362 via a UI actuation mechanism, such as a pointer or by tabbing to the desired play button and hitting the "enter" key. Upon selection of a button, the multimedia player performs the requested action (e.g., stops or pauses playback, rewinds, etc.).

Volume control 364 allows the user to adjust the volume of the audio portion of the multimedia content.

Content information space 372 lists information pertaining to the multimedia content being rendered on the screens 354–358. The content information space includes the show name, author and copyright information, and tracking/timing data.

Figure 11:
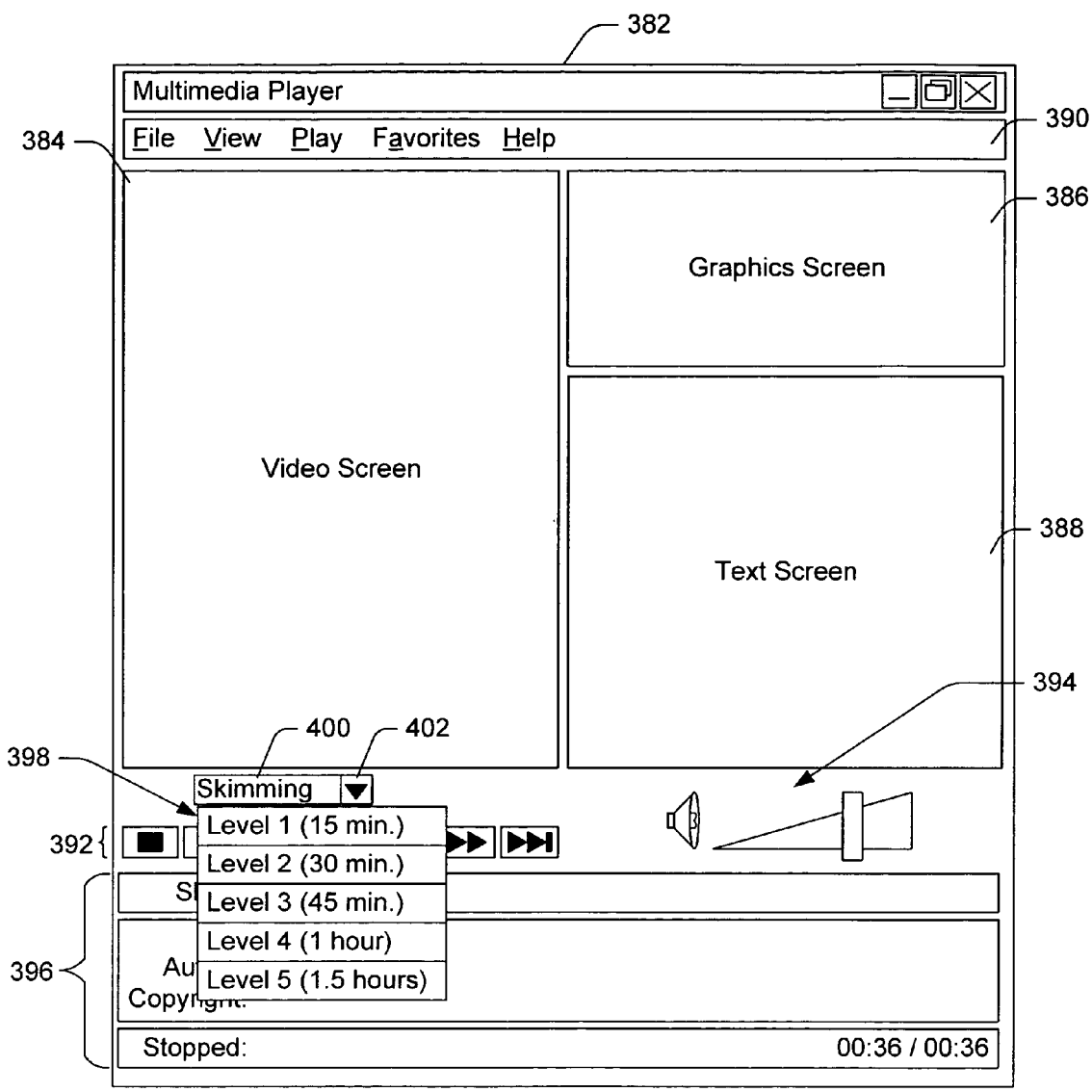
FIG. 11 shows another implementation of a graphical user interface window that displays multimedia content at a client computer.

FIG. 11 shows another implementation of a graphical user interface window that displays multimedia content at a client computer 104 of FIG. 1. The user interface 382 is provided by multimedia player 280 of FIG. 6 or FIG. 7.

Many of the components of UI window 382 are analogous to those of UI window 352 of FIG. 10. Like UI window 352 of FIG. 10, UI window 382 includes a video screen 384, a graphics screen 386, a text screen 388, a command bar 390, shuttle controls 392, a volume control 394, and content information space 396. Each of these is analogous to the corresponding components of UI 352 of FIG. 10.

UI 382 also has a menu 398 associated with skimming button 400. In this illustration, menu 398 is a drop-down or pull-down menu that opens beneath skimming button 400 in response to actuation of a tab 402. Alternatively, menu 398 may be invoked by placing a pointer over skimming button 400 and right clicking a mouse button.

Menu 398 lists multiple skimming levels from which a user can select. In the illustrated example, five skimming levels are listed: level 1 (15 minute presentation duration), level 2 (30 minutes presentation duration), level 3 (45 minute presentation duration), level 4 (1 hour presentation duration), and level 5 (1 ½ presentation time). The user can select one of the listed skimming levels to instruct the multimedia player to present the corresponding preview content. The user can select a new skimming level after the multimedia player has begun presentation by invoking the menu and selecting the new level. In response, the multimedia player presents a new skimmed version corresponding to the new skimming level.

FIGS. 10 and 11 are merely exemplary illustrations of user interfaces via which a user can select a skimming level. Alternatively, other interfaces could be used via which the user can change the skimming level, such as a rotatable dial, a sliding scale, an alphanumeric input control (e.g., allowing the user to type in a number, letter, or word), etc.

CONCLUSION

The invention provides multi-level skimming of multimedia content using playlist. A playlist for a skimmed version of the multimedia content is generated from skimming information maintained along with the multimedia content. The skimming information advantageously identifies segments of the multimedia content, thereby conserving storage space by eliminating the need to duplicate storage of the actual segments.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A system for providing a skimmed version of multimedia content, the system comprising:
    means for accessing first skimming information corresponding to a first skimming level of a plurality of previously generated skimming levels of the multimedia content;
    means for using the first skimming information to access a first plurality of segments of the multimedia content that correspond to the first skimming level;
    means for forwarding the first plurality of segments to a client computer;
    means for receiving a selection of a second skimming level of the plurality of previously generated skimming levels from the client computer while the first plurality of segments are being forwarded to the client computer;
    means for accessing second skimming information corresponding to the second skimming level;
    means for using the second skimming information to access a second plurality of segments of the multimedia content that correspond to the second skimming level; and
    means for forwarding the second plurality of segments to the client computer.

2. A system as recited in claim 1, wherein the means for forwarding the first plurality of segments comprises means for streaming the accessed first plurality of segments to the client computer.

3. A system as recited in claim 1, wherein the means for using the first skimming information comprises means for generating a playlist based on the first skimming information.

4. A system as recited in claim 1, wherein the means for receiving further comprises means for receiving an indication of a current presentation time of the first plurality of segments.

5. A system as recited in claim 4, wherein the indication comprises the presentation time referenced to the timeline of the multimedia content.

6. A system as recited in claim 4, wherein the indication comprises a current segment of the first plurality of segments and an offset into the current segment.

7. A system as recited in claim 1, wherein the means for forwarding the second plurality of segments comprises:
    means for identifying a current presentation time of the first plurality of segments;
    means for identifying a time in the second plurality of segments that corresponds to the current presentation time; and
    means for forwarding the second plurality of segments to the client computer starting with the time in the second plurality of segments that corresponds to the current presentation time of the first plurality of segments.

8. A system for presenting a skimmed version of multimedia content, the system comprising:
    means for accessing first skimming information corresponding to a first skimming level of a plurality of previously generated skimming levels of the multimedia content;
    means for using the first skimming information to generate a playlist identifying a first plurality of segments of the multimedia content that correspond to the first skimming level;
    means for retrieving the first plurality of segments from a storage device; and
    means for presenting the first plurality of segments as the skimmed version.

9. A system as recited in claim 8, wherein the means for retrieving comprises:
    means for transmitting the playlist to a server computer; and
    means for receiving the first plurality of segments from the server computer.

10. A system as recited in claim 8, further comprising:
    means for receiving user input identifying a second skimming level of the plurality of previously generated skimming levels while the first plurality of segments is being presented;
    means for accessing second skimming information corresponding to the second skimming level;
    means for using the second skimming information to generate a second playlist identifying a second plurality of segments of the multimedia content that correspond to the second skimming level;
    means for retrieving the second plurality of segments from the storage device; and
    means for presenting the second plurality of segments as the skimmed version.

11. A system as recited in claim 10, wherein the means for retrieving the second plurality of segments comprises:

means for transmitting the second playlist to a server computer; and means for receiving the second plurality of segments from the server computer.

12. A computer comprising:

a processor; and a memory, coupled to the processor, storing instructions that, when executed by the processor, cause the processor to provide a skimmed version of multimedia content by:

accessing first skimming information corresponding to a first skimming level of a plurality of previously generated skimming levels of the multimedia content;

using the first skimming information to access a first plurality of segments of the multimedia content that correspond to the first skimming level;

forwarding the first plurality of segments to a client computer;

receiving a selection of a second skimming level of the plurality of previously generated skimming levels from the client computer while the first plurality of segments are being forwarded to the client computer;

accessing second skimming information corresponding to the second skimming level;

using the second skimming information to access a second plurality of segments of the multimedia content that correspond to the second skimming level; and forwarding the second plurality of segments to the client computer.

13. A computer as recited in claim 12, wherein the forwarding the first plurality of segments comprises streaming the accessed first plurality of segments to the client computer.

14. A computer as recited in claim 12, wherein the using the first skimming information comprises generating a playlist based on the first skimming information.

15. A computer as recited in claim 12, wherein the receiving further comprises receiving an indication of a current presentation time of the first plurality of segments.

16. A computer as recited in claim 15, wherein the indication comprises the presentation time reference to the timeline of the multimedia content.

17. A computer as recited in claim 15, wherein the indication comprises a current segment of the first plurality of segments and an offset into the current segment.

18. A computer as recited in claim 12, wherein the forwarding of the second plurality of segments comprises:

identifying a current presentation time of the first plurality of segments;

identifying a time in the second plurality of segments that corresponds to the current presentation time; and forwarding the second plurality of segments to the client computer starting with the time in the second plurality of segments that corresponds to the current presentation time of the first plurality of segments.

* * * * *

UNITED STATES PATENT AND TRADEMARK OFFICE
CERTIFICATE OF CORRECTION

PATENT NO. : 7,069,311 B2
APPLICATION NO. : 11/016628
DATED : June 27, 2006
INVENTOR(S) : Gupta et al.

It is certified that error appears in the above-identified patent and that said Letters Patent is hereby corrected as shown below:

On the Title page, Item (57), in "Abstract", in column 2, line 9, delete "generated" and insert -- generate --, therefor.

On the Title page, Item (57), in "Abstract", in column 2, line 11, delete "provided" and insert -- provide --, therefor.

In column 1, line 44, after "as-needed" delete ",".

In column 1, line 61, delete "textural" and insert -- textual --, therefor.

In column 1, line 65, delete "median" and insert -- media --, therefor.

In column 4, line 13, delete "steam" and insert -- stream --, therefor.

In column 4, line 45, delete "use" and insert -- used --, therefor.

In column 5, line 27, delete "use" and insert -- be --, therefor.

In column 7, line 22, after "hardware" delete ",".

In column 7, line 60, delete "steams" and insert -- streams --, therefor.

In column 8, line 7, after "stored in" insert -- . --.

In column 9, line 16, delete "illustrates" and insert -- illustrated --, therefor.

In column 9, line 21, after "(7–9)" insert -- , --.

In column 9, line 22, delete "(1714 22)" and insert -- (17–22) --, therefor.

In column 9, line 23, after "forty-sixth" delete "second" and insert -- seconds --, therefor.

In column 9, line 51, delete "levels" and insert -- level --, therefor.

In column 10, line 13, delete "play" and insert -- player --, therefor.

CERTIFICATE OF CORRECTION (continued)
U.S. Pat. No. 7,069,311 B2

In column 12, line 22, after "selection" insert -- , --.

In column 12, line 54, after "Thus" insert -- , --.

In column 13, line 13, delete "frames" and insert -- frame --, therefor.

In column 13, line 47, delete "cold" and insert -- could --, therefor.

In column 13, line 62, after "audio" delete ",".

In column 15, line 8, delete "minutes" and insert -- minute --, therefor.

In column 15, line 10, delete "1 ½" and insert -- 1½ hours --, therefor.

In column 18, line 13, in Claim 16, delete "reference" and insert -- referenced --, therefor.

Signed and Sealed this

Twentieth Day of April, 2010

David J. Kappos
*Director of the United States Patent and Trademark Office*